2,765,284
Patented Oct. 2, 1956

2,765,284

CHELATING AGENTS

Frederick C. Bersworth, Framingham Center, Mass., assignor to The Dow Chemical Company, Midland, Mich., a corporation of Delaware No Drawing. Application April 20, 1954,
Serial No. 424,519

2 Claims. (Cl. 260—2)

This invention relates to metal ion chelating agents and has for its object the provision of a metal ion chelating agent comprised of a polymerized alkylene polyamino polycarboxylic acid compound.

Another object is to provide a method of producing a water soluble resinous chelating agent consisting of a polymerized alkylene polyamino polycarboxylic acid compound.

A further object is to provide a water soluble resinous polymeric product consisting of an alkylene polyamino polycarboxylic acid compound.

Other objects will be apparent as the invention is more fully hereinafter disclosed.

In accordance with these objects I have discovered that epoxy alkylene polyamino polycarboxylic acids containing at least one undisplaced amino hydrogen polymerize in aqueous and non-aqueous solutions with formation of long-chain polymeric products which on heating solidify into solid phase resinous products that are soluble in aqueous solutions over a wide range of acid and alkaline pH and which exhibit marked metal ion chelating properties.

The epoxy alkylene polyamino polycarboxylic acids utilizable in this invention are those conforming to the structural formula:

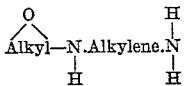

wherein

represents an alkyl group having a plurality of carbon atoms to two adjacent carbon atoms is attached the —O— group recognized in the art as olefine oxides or alkylene oxides; alkylene represents one of the group consisting of CH₂.CH₂; CH₂.CH₂.CH₂; and

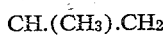

CH.(CH₃).CH₂ and wherein not more than two of the three amino hydrogens are displaced by one of the groups CH₂.COOM and CH₂.CH₂.COOM wherein M is hydrogen or an alkali metal.

Epoxy compounds conforming to the above structure may be prepared by carboxymethylating a polyhydroxy aliphatic polyamine, in accordance with the process disclosed in my prior Patent No. 2,407,645, issued September 17, 1946, to displace at least one but not more than two of the amino hydrogens present therein with acetic acid groups, recovering the polyhydroxy aliphatic polyamino polycarboxylic acid alkali metal salt product from the reaction solution by evaporating off the water of solution, and dehydrating this salt by suspending the salt in xylene or toluene and heating the suspension for an extended time interval at a temperature within the range 100°–130° C. at which an azeotropic mixture of water and xylene (or toluene) distills off, the heating being continued until no further distillation of this azeotropic mixture can be detected.

In the carboxymethylation of an alkylene diamine the reaction proceeds substantially quantitatively to replace the amino hydrogens in accordance with the number of moles of cyanide used. Where the starting amine is substituted in one nitrogen or another, the carboxymethylation proceeds preferentially in the unsubstituted nitrogen in accordance with the following scheme:

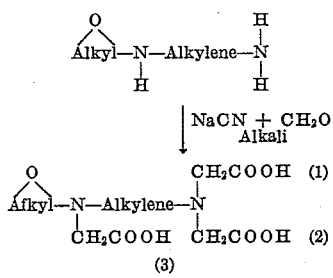

That is, the carboxymethylation proceeds first in the positions designated 1 and 2. By reacting the desired starting amine with two moles of cyanide-formaldehyde, the di-carboxymethylated amine used as preferred starting material is derived.

The particular method of producing these epoxy compounds forms no part of the present invention, said method being disclosed and claimed in my copending applications Serial Nos. 386,648, abandoned and continued as S. N. 426,925, filed April 30, 1954, and 386,649, filed October 16, 1953, issued July 5, 1955, as United States Patents 2,712,545 and 2,712,544 respectively.

The present invention is based on the discovery that these said epoxy compounds in which there is at least one undisplaced amino hydrogen will polymerize into long-chain resinous compounds having metal ion chelating properties when the compound is suspended in an aqueous or non-aqueous solution and heated therein for an extended time.

On the manufacture of these epoxy compounds according to the above disclosed process, it is my belief based on extended experience, that when the polyhydroxy polyamine is carboxymethylated, according to the prior patented process, the last amino hydrogen to be displaced by acetic acid groups according to the process is that hydrogen which is attached to the amino nitrogen that carries the polyhydroxy alkyl group.

My experiments have indicated that the chelating properties of these resins increase with increase in the number of acetic acid groups present in each epoxy compound and for the purposes of the present invention I prefer to form polymers of the epoxy alkylene diamine diacetic acid compounds conforming to the following structure, although the mono-acetic acid compounds for many purposes are equally as effective chelating agents for the purposes of the present invention and are to be understood as being included herein:

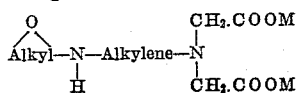

wherein

and alkylene are the same as above identified in the first formula.

With compounds of this type I have found that under proper conditions, as will hereinafter be stated, polymeric resins conforming to the following structure may be formed:

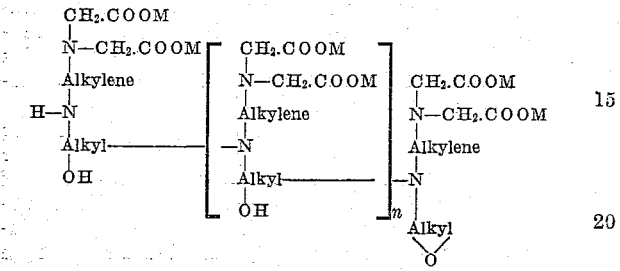

wherein $n$ is a numeral within the ranges 3 to 30, and alkyl and alkylene are as above defined.

This epoxy-polymer, wherein $n$ represents the total number of diamino molecules interposed between the two end molecules of the polymer within the range 3 to 30 is essentially a water soluble resinous product which is obtained at moderate temperatures, usually as semi-fluid viscous oil to a sticky-semi-solid product depending on the number of molecules comprising the polymer which on heating to 100° C. or somewhat higher in an inert atmosphere further polymerizes and hardens or solidifies to a yellow to brown brittle resin, which when cooled and dried may be pulverized to a fine, nearly white powder. This resin also is water soluble and exhibits solubility in polar solvents which is not evidenced by the polymers where $n$ is in the lower values of the range 3 to 30.

It is believed that the conversion of this fluid or sticky-semi-solid polymer to a yellow to brown brittle resin on heating to 100° C. is the resultant of the formation of longer chained polymers between adjacent polymers until solid phase resinous polymer products are formed.

As can be noted in this formula each diamino molecule has two carboxymethyl groups on one amino nitrogen. These groups in acid pH solutions become acidic and in alkaline pH solutions become basic, without physical change in the resin. Thus, by neutralizing the resin with acid an acid resin is formed and by neutralizing the acid resin with an alkaline pH solution a basic resin is formed. Each of these resins is water soluble.

My experiments have indicated that when the acid resin is introduced into an aqueous solution of a metal salt, the metallic constituent of the salt is taken up by the resin with formation of an acid solution where the acidity of the solution is maintained dilute. Conversely, when the basic resin is introduced into a strongly acid solution, the basic ion of the carboxymethyl groups passes into the acid solution with formation of an acid resin.

The order of displacement of basic ions in the basic resin varies somewhat with the acidic radical present in the solution but substantially follows the order of displacement of metals in acetate solutions.

As one specific example of chelating resin conforming to the present invention the resinous compound obtained from epoxy-ethyl ethylene diamine diacetic acid disodium salt will be described.

The disodium salt, above identified, is suspended in an aqueous solution of dioxane and water, consisting of 75 percent dioxane and 25 percent water, and the suspension is heated at the refluxing temperature of the solution with agitation for an extended time period, usually from 5 to 10 hours.

The finely divided somewhat sticky polymerized product thus obtained is separated from the reaction solution, as by filtering, and after thorough drying is compacted into a large mass and the mass is heated for an extended time interval in an inert atmosphere at about 100° C. to consolidate the material into a brittle resinous solid. The resultant solid phase resin then is cooled and reduced to fine particle size by grinding and is ready for use as a metal ion chelating agent.

According to all the tests made on this resin the structure of the same conforms to the formula:

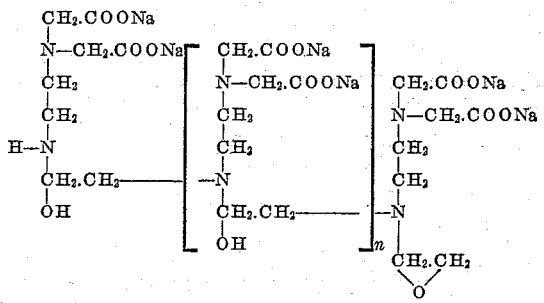

wherein $n$ is a numeral within the range 15 to 30.

This polymer is a light yellow brittle solid which in finely divided form is soluble in the cold or on heating in aqueous solutions over a wide range of acid to alkaline pH. In acid pH solutions the resin goes into solution as the acid polymer. In alkaline pH solution the resin goes into solution as the alkaline salt of the resin. The acid and alkaline salts of the resin both react as chelating agents for polyvalent metal ions forming poly metal ion chelates which remain soluble. These poly metal chelates are more soluble in organic systems than either the acid resin or the salts of the resin, which property gives wide utility to the resinous polymer chelating agent as an addition agent to synthetic and natural resins and resinous polymeric compounds, as metal ion scavengers, heat and light stabilizer agents, plasticizers, particularly in the type of synthetic resins known as vinyl resins, chlorinated rubber resins, synthetic and natural rubber and the like. The poly metal ion chelate, per se, has wide utility as a metal ion carrier in such resinous systems.

The particular value of the compounds is in their usefulness as chelate-forming resins. Since the structure is characterized by the presence of a pair of carboxymethyl groups oriented on an amino group, reaction with polyvalent metals results in the following type of compound:

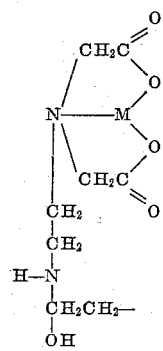

wherein M is a polyvalent metal such as calcium, magnesium, strontium, barium, iron, cobalt, copper, nickel, etc.

In place of the ethylene diamine compound given in the above specific example, I may employ the isopropyl diamine compound or the trimethylene diamine compound to form analogous reaction products having similar chelating properties.

The property of the resin which permits it to exist in the acid or salt form by acidification or neutralization prior to isolation of it, may be summarized as follows:

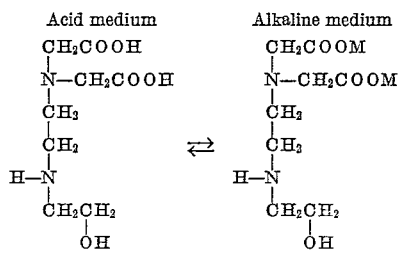

That is, the carboxylic groups appear as acid groups or as salts thereof depending upon the condition of the medium from which the compounds are isolated. Acid resins, alkali metal salts, and ammonium base salts are thus prepared.

This application is a continuation-in-part of my application Serial No. 281,899, filed April 11, 1952, now abandoned.

Having hereinabove described the present invention generically and specifically and having given several specific examples of the same, all modifications and departures therefrom are contemplated as may fall within the scope of the following claims.

What is claimed is:

1. The composition formed by polymerizing a chelating compound conforming to the following generic formula:

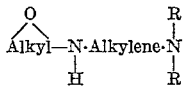

wherein

represents an alkyl group having a plurality of carbon atoms carrying an —O— group on two adjacent carbon atoms; alkylene is selected from the group consisting of —CH$_2$·CH$_2$—; —CH$_2$·CH$_2$·CH$_2$—; and

—CH·(CH$_3$)·CH$_2$—

R is selected from the group consisting of —CH$_2$COOH and —CH$_2$·CH$_2$·COOH and the alkali metal salts thereof; the polymer being that formed by suspending said starting material in a medium comprising a mixture of dioxane and water, heating the said mixture at refluxing temperature for a period of time sufficient to accomplish the said polymerization, and thereafter separating the polymerized material from the reaction mixture.

2. The product in accordance with claim 1, in which the polymerizing heating step is carried out for a period of 5 to 10 hours.

No references cited.